(12) United States Patent
Shortridge, Sr.

(10) Patent No.: US 9,885,338 B2
(45) Date of Patent: Feb. 6, 2018

(54) WIND TURBINE BEARING ASSEMBLY (71) Applicant: Robert Alan Shortridge, Sr., Powhatan, VA (US)

(72) Inventor: Robert Alan Shortridge, Sr., Powhatan, VA (US)

( * ) Notice: Subject to any disclaimer, the term of this patent is extended or adjusted under 35 U.S.C. 154(b) by 296 days.

(21) Appl. No.: 14/710,678

(22) Filed: May 13, 2015

(65) Prior Publication Data

US 2016/0333859 A1   Nov. 17, 2016

(51) Int. Cl.
*F03D 1/06* (2006.01)
*F03D 9/12* (2016.01)

(52) U.S. Cl.
CPC ............ *F03D 1/0691* (2013.01); *F03D 9/12* (2016.05); *Y02E 10/721* (2013.01); *Y02E 60/16* (2013.01)

(58) Field of Classification Search
CPC ...... F03D 1/065; F03D 1/0666; F03D 1/0691; F03D 9/12; F03D 80/70; Y02E 60/16; Y02E 10/721; F05B 2240/50; F05B 2240/52; F16C 17/10; F16C 17/107; F16C 33/38; F16C 37/00; F16C 2361/31
See application file for complete search history.

(56) References Cited

U.S. PATENT DOCUMENTS 6,648,510 B2 * 11/2003 Orndorff, Jr. ........ B63H 23/326
                                                       384/295
7,816,799 B2 * 10/2010 Nair ........................ F03D 80/70
                                                        290/44

* cited by examiner

*Primary Examiner* — Kenneth Bomberg
*Assistant Examiner* — Hoon Choi
(74) *Attorney, Agent, or Firm* — John H. Thomas, P.C.

(57) ABSTRACT

A wind turbine system includes turbine blades connected to a nose hub that is connected to a main turbine shaft. A flywheel is mounted around the main turbine shaft proximate to the nose hub. A bearing assembly is fixed to a turbine tower and is mounted around at least a portion of the flywheel. The bearing assembly includes a bearing housing and a main bearing fixed therein having a main bearing faced adapted to be in contact with or within a close tolerance to the circular outside diameter surface of the flywheel. This main bearing may be comprised of lignum vitae wood.

13 Claims, 7 Drawing Sheets

WIND TURBINE BEARING ASSEMBLY

The field of the present invention is bearings for use with horizontal wind turbines. Specifically, the invention relates to bearings for supporting the main turbine shaft in a wind turbine system.

BACKGROUND

A great deal of interest and resources are being directed to the development of wind as a clean energy resource. At the utility level, the wind is being harnessed through the use of large wind turbines. These turbine structures are not only large, but they are very heavy. Further, by the very nature of the location and deployment of these wind turbines, the wind turbine structures are subject to significant environmental extremes including, for instance, weather conditions such as high winds and changing wind directions. This is all important information that must be factored and considered by the wind turbine manufacturers. The high winds and changing winds can create huge stresses on the turbine structure itself, especially the rotation of the main turbine shaft. If the turbine blades cannot be rotated without significant vibration, then heat may build-up within the system. There can be shaft failures or other failures within the turbine system.

Numerous bearing systems have been engineered to try to address these requirements of large wind turbines. Exotic metals and lubricants have been created to try to stand up to the environmental stresses that are imposed on large wind turbine systems. However, not all of the current technology has been successful or, alternatively, enjoyed the longevity that is desired by the wind turbine manufacturers.

SUMMARY

Accordingly, it is an object of the present invention to provide a main bearing assembly that is mounted in a wind turbine system around a main shaft and proximate to the turbine blades in the wind turbine structure. This assembly substantially eliminates or reduces the likelihood of damaging vibrations of the turbine shaft during operation.

In one example a wind turbine system comprises a turbine blade connected at a nose hub to a main turbine shaft. The main turbine shaft is operatively connected to a turbine generator. The turbine blades and main turbine shaft and generator are all mounted onto a turbine tower. A flywheel is configured around the main turbine shaft proximate to the nose, the flywheel being a disc having a flywheel thickness and defining a circular outside diameter surface. A bearing assembly is fixed to the turbine tower and around at least a portion of the flywheel including the circular outside diameter of the flywheel. The bearing assembly includes a bearing housing and a main bearing fixed to the housing and having a main bearing face adapted to be in contact with or within a close tolerance to the circular outside diameter surface of the flywheel. The main turbine shaft is securely maintained and supported in the bearing assembly so that it rotates substantially without any vibration caused by wind turning the turbine. The main bearing may be comprised of lignum vitae wood. The flywheel may be mounted around the main turbine shaft and less than about twelve inches from the nose hub. The bearing assembly may further comprise side wall bearings fixed to the bearing housing and having side wall bearing faces adapted to be in contact with or within a close tolerance to flat side wall surfaces on opposite sides of the fly wheel proximate the outside diameter of the flywheel. Both the main bearing and side wall bearings may be comprised of lignum vitae wood. The bearing assembly may further comprise a water lubrication system. The main bearing may further comprise a screw that connects the main bearing to the bearing housing, where by the distance between the main bearing face and the outside diameter surface of the flywheel is adjustable by turning the screw.

In another example, a wind turbine system comprises a turbine blade connected at a hub flywheel to a main turbine shaft. The main turbine shaft is operatively connected to a turbine generator and the turbine blades and main turbine shaft and generator are mounted onto a turbine tower. The hub flywheel is configured around a front end of the main turbine shaft, the hub flywheel being a disc having a flywheel thickness and defining a circular outside diameter surface. A bearing assembly is fixed to the turbine tower and around at least a portion of the hub flywheel including the circular outside diameter of the hub flywheel. The bearing assembly further comprises a bearing housing and a main bearing fixed therein having a main bearing face adapted to be in contact with or within a close tolerance to the circular outside diameter surface of the hub flywheel. The main turbine shaft is securely maintained and supported so that it rotates substantially without any vibration caused by wind turning the turbine. This main bearing may be comprised of lignum vitae wood. The bearing assembly may further comprise sidewall bearings fixed to the bearing housing and having sidewall bearing faces adapted to be in contact with or within a close tolerance to flat sidewall surfaces on opposite sides of the hub flywheel proximate the outside diameter of the hub flywheel. Both the main bearing and sidewall bearings may be comprised of lignum vitae wood. The bearing assembly may include a water lubrication system.

DETAILED DESCRIPTION

The invention is directed to bearings and bearing assemblies for use in large-scale wind turbine systems. Broadly speaking, these wind turbine systems include long turbine blades that are connected to a central hub also referred to as the nose of the wind turbine. This nose is fixed to the main turbine shaft that is rotated with the rotation of the turbine blades in the wind. The main turbine shaft may be connected directly to a generator or, alternatively, through a gear system to a further shaft or shafts that turn inside a generator. The main turbine shaft and generator and other operational electronic systems are all mounted within a cab. This cab is the large housing structure that is finally attached to a wind turbine tower.

These wind turbine systems are engineered to be small enough for residential, retail use. On the opposite end of the engineering spectrum, large utility and industrial wind turbines may include blades that are over one hundred feet long, mounted on a tower that carries the cab more than one hundred and fifty feet in the air above the ground or water surface.

The primary load bearing and working component of the wind turbine system is the horizontal main turbine shaft. The turbine blades and nose hub are carried on one end of the main turbine shaft. The weight of the turbine blades and nose and their rotation as caused by the wind can translate into significant stresses on the main turbine shaft. Accordingly, the main turbine shaft must be carried as securely as possible to prevent or reduce vibration of the main turbine shaft. Otherwise, the flex and stresses that can form as a result of the vibration of the main turbine shaft can lead to failures and property damage.

A main turbine shaft bearing is mounted around and supports a flywheel that is fixed to the main turbine shaft. Importantly, the main bearing is mounted around the main shaft close to the location where the nose hub is also mounted to the main turbine shaft. By mounting the main bearing and having it support the main turbine shaft close to the nose end of the main turbine shaft, there is reduced leverage and resulting potential vibration of the shaft. Alternatively, as later described, the nose hub can be a portion of or connected directly to the flywheel.

Wind turbine blades are typically fabricated from lightweight, but durable materials including metals, polymers, carbon fibers and composites thereof. The blades typically have an adjustable pitch that enables control of the rotational speed of the blades depending on the velocity of the winds that drive those blades. The windmill turbine blades are further provided in an array of a plurality of blades, typically three or more blades.

The blades are connected to the turbine system at the nose. The nose hub connects to one end of the blades. The nose is typically round and includes an aerodynamic cone point facing into the direction of the wind in order to enhance the laminar air flow over the middle of the blade array. It is the center of the nose hub that is connected to the end of the main turbine shaft. The nose hub may include components that allow the blades to be turned to increase or decrease their pitch with respect to the wind direction coming across those blades. By adjusting the pitch of those blades, the speed with which those blades turn in the wind can be adjusted and controlled.

The main turbine shaft extends from the nose hub on one end to at least the generator on an opposite end. This main turbine shaft may have a diameter of about four to twenty-four inches. As noted earlier, there can be a gear system in between the nose and the generator that rotates secondary turbine shafts having increased RPMs to turn a generator. Under ideal conditions, there is no vibration during the rotation of the main turbine shaft. That shaft is secured in bearings that are fixed around the main turbine shaft along its length.

The cab is the box or container that protects the generator and that controls the blade pitch and direction of the blades. Bearings are fixed to the cab structure and secure the main turbine shaft to the cab structure. The wind turbine tower supports the cab from the ground or other surface below the tower. In operation, the cab includes a swivel connection to the tower so that the blades may be favorably directed into the direction of the wind for maximum efficiency.

A flywheel is configured to be mounted onto or formed as an integral portion of the main turbine shaft directly behind the nose (or integral with the nose). The flywheel may have an outside diameter of from about four feet to sixteen feet. This flywheel is expected to be approximately two to six inches thick, at least for the flywheel portion proximate the outside rim diameter. In other words, the outside diameter defines a width approximately two to six inches thick in a flat cross sectional configuration. The flywheel may be a simple disc, or alternatively, the flywheel can be integral with and partially milled out along the diameter of the flywheel. The flywheel is typically full thickness where it is connected to the main turbine shaft and is likewise relatively full thickness, approximately two to six inches, at the outside diameter and approximately six to twelve inches from the outside diameter towards the center of the flywheel along the diameter length. This flywheel is not a conventional component in a wind turbine system.

The distance of the flywheel from the back of the nose hub along the linear length of the main turbine shaft should be relatively short or close in order to minimize the cantilever effect of the turbine blades on the shaft. The near edge of the flywheel may be approximately two to twelve inches, or alternatively about three to six inches, from the back of the nose hub along the linear length of the main turbine shaft.

In another example, in order to remove any distance altogether between the turbine connection and the main turbine shaft, turbine blades may be attached on one end directly to the flywheel or portion of the flywheel as described herein. In this way, there is no separate nose hub that is distanced from the flywheel. The flywheel acts also as a nose hub. Similar to a nose hub, the flywheel may likewise include an aerodynamic cone point facing into the direction of the wind to enhance the laminar airflow over the middle of the array of turbine blades.

A main bearing housing is fixed rigidly to the cab structure at the front of the cab next to or near the nose section and connected to the main turbine shaft. This bearing housing is a substantial, rigid housing that must endure and carry the weight of the main turbine shaft and the front end components including the turbine blades and the nose hub of the wind turbine. This bearing housing may be round to more closely imitate the shape of the flywheel that it is mounted around. The housing must include a rigid round support onto which the bearing elements are fixed to support the rotating shaft therein.

As described herein, the main bearing includes a plurality of blocks mounted in the bearing housing and around the outside perimeter of the flywheel that is, in turn, fixed on the main turbine shaft. Each of these main bearing blocks has a bearing face that is adjacent the outside perimeter face of the flywheel. These plurality of blocks will face and bear against the surface or be separated from the surface of the outside diameter of the surface of the flywheel during operation. During operation, a small gap for a lubricant is preserved between the bearing faces and the rotating flywheel. This gap may be 0.0 to 0.01 inches or alternatively about 0.001 to 0.003 inches. The multiple blocks of the main bearing are separated from each other in a circumferential line around the outside perimeter surface of the flywheel in order to enable a lubricant to circulate around the block and especially around the bearing face of each block. The resulting effect is the main bearing shaft turning on a thin layer of lubricant.

In addition to the main bearings, there may also be sidewall bearings. The flywheel includes a smooth, annular face on opposite sides of the flywheel at approximately the outside diameter of each side of the flywheel disc. The smooth annular face has a circumferential width of at least about two to eight inches. This face may be channeled or scored to improve lubrication flow. The sidewall bearing blocks are mounted next to each other and around the annular circumference of the flywheel. While the sidewall bearing blocks can be mounted in direct contacting and touching against each other, alternatively, a gap can be left between each block to enable the flow of lubricant around each sidewall bearing block, especially against the sidewall bearing face that is against or very near the circumferential surface of the flywheel. The size of the sidewall bearing blocks is approximately 2×2 inches up to 6×6 inches. The radial width of the block can be about two to six inches. The radial length of the sidewall bearing blocks may be about two to six inches. These sidewall bearing blocks may have a square or trapezoidal wedge shape.

The bearing material of the main bearing block components can be any strong or resilient material. In one example, the bearing blocks are formed from the wood of a lignum vitae tree. The plane of the bearing face of the lignum vitae wood blocks is preferably substantially perpendicular to the grain of the wood. In another example, each block may be a cut from the center of a piece of wood. Still further alternatively, the grain of the wood may be angled or horizontal with the plane of the bearing face. A benefit of a lignum vitae bearing material is that it is water lubricated.

The bearing material may be alternatively manufactured of metal, polymers, ceramics, or composites of one or more of the foregoing. These alternative materials required compatible lubricants to improve the movement of the shaft over the bearing surface. Other lubricants might include mineral oil or synthetic oil products.

The thickness of the bearing blocks can be approximately one inch, or alternatively one half to two inches, or still further alternatively about one-quarter to four inches. In the example of a lignum vitae bearing block component, the block is approximately one half to two inches in thickness.

The multiple bearing block components are attached to and supported by the main bearing housing. Each block may be mounted onto a spring that biases each block face against the face of the flywheel perimeter surface or sidewall surface. Each spring around the circumference may be of approximately uniform force. Alternatively, the springs may be stronger or lighter depending on the housing location with the heaviest springs typically being mounted underneath the flywheel with respect to the orientation of the flywheel versus the ground. Alternatively, there may be less force on top of the flywheel that presses downwardly against the bottom of the bearing assembly. Alternatively, the bearing components may be screwed by a fixed thread in the bearing housing. This screw is adjustable by a maintenance service provider to allow that maintenance person to tighten or loosen and thereby vary the distance of the bearing face from the flywheel face. Typically, the bearing surface would be tightened so that it moves closer to the flywheel surface to account for some wear of that bearing surface.

Accordingly, the bearing block components may be adjusted in a fixed relationship with respect to the bearing surface through means of a screw or similar mechanism. Secondly, the bearing block components may be connected to the main bearing housing through use of a spring system that bears that block and biases it against the bearing surface at variable spring strengths. An additional attachment mechanism includes a pneumatic or hydraulic connection. In this way, the bearing block components may be connected to the main bearing housing using a pneumatic or hydraulic piston which regulates the pressure of the bearing blocks against the bearing surface. This pneumatic or hydraulic system may also be electronically controlled and monitored so that the specific distance between the bearing block and the face of flywheel can be adjusted and the pressure of that bearing block against the flywheel surface may be adjusted. This may be used especially during varying weather conditions that can benefit from close monitoring and control of the vibration of the flywheel by capturing it tightly or more loosely in the main bearing housing. For instance, if more pressure is sensed in one area of the bearing assembly, then the pressure of the bearing blocks in other areas of the bearing assembly can be adjusted to more evenly capture the weight of the flywheel in the bearing housing. In this embodiment of a system where the bearing blocks may be variably controlled with respect to the bearing surface and the pressure biased against the bearing surface, an electrical servomotor could alternatively be used similar to a pneumatic or hydraulic system. Only the rigid screw system is shown in the drawings, especially FIGS. 5 and 6, but those of skill in the art will understand that those screws can be replaced by pneumatic, hydraulic or electronic servomotor assemblies.

Figure 1:
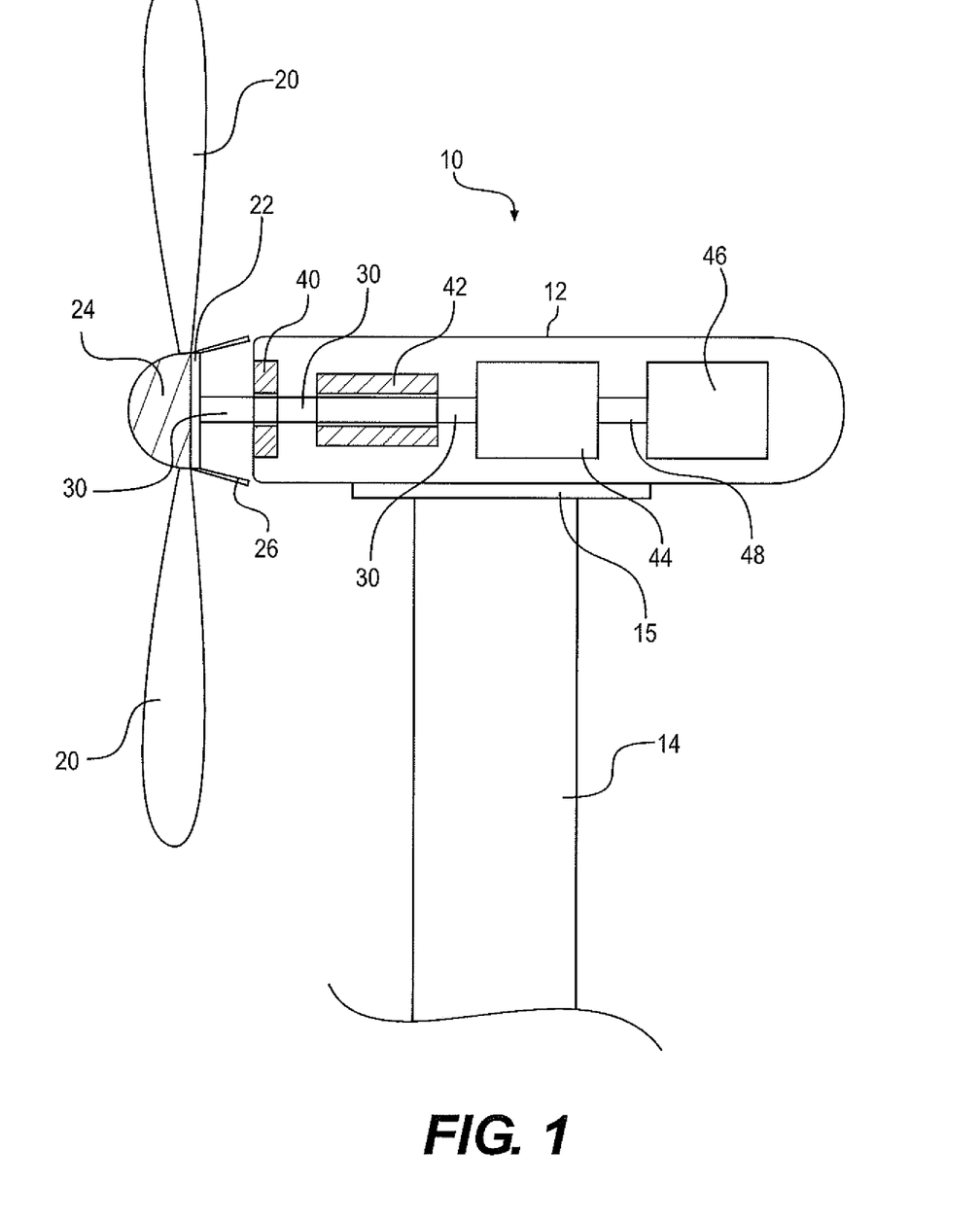
FIG. 1 is a side cross-sectional view of a conventional wind turbine system.

FIG. 1 illustrates a side cross-sectional view of a conventional wind turbine system. FIGS. 2-6 illustrate various views of one example of the wind turbine system described herein. And FIG. 7 illustrates a partial side cross-sectional view of another example of a wind turbine system described herein.

In FIG. 1, the wind turbine system 10 includes a cab 12 carried on a turbine tower 14. The cab 12 and tower 14 are connected by way of a rotating table 15 so that the wind turbine may be adjusted to face into the wind at all times. Turbine blades 20 are connected to a nose hub 22. Attached to the front of the nose hub 22 is an aerodynamic cone 24 and aerodynamic fender 26. The cone 24 and fender 26 improve the laminar flow of air across the wind turbine system 10. The nose hub 22 is attached to the front end of the main turbine shaft 30. Extending backwardly from the nose hub 22, the main turbine shaft 30 is supported by a main bearing 40 at the front of the cab 12. The main turbine shaft 30 further extends into the cab 12 and through an intermediate bearing 42 before passing into a gear box 44. The gear box 44 converts the rotation of the main turbine shaft 30 into a higher rpm shaft 48 that drives a generator 46 which is the power-forming component of the wind turbine system 10.

Figure 2:
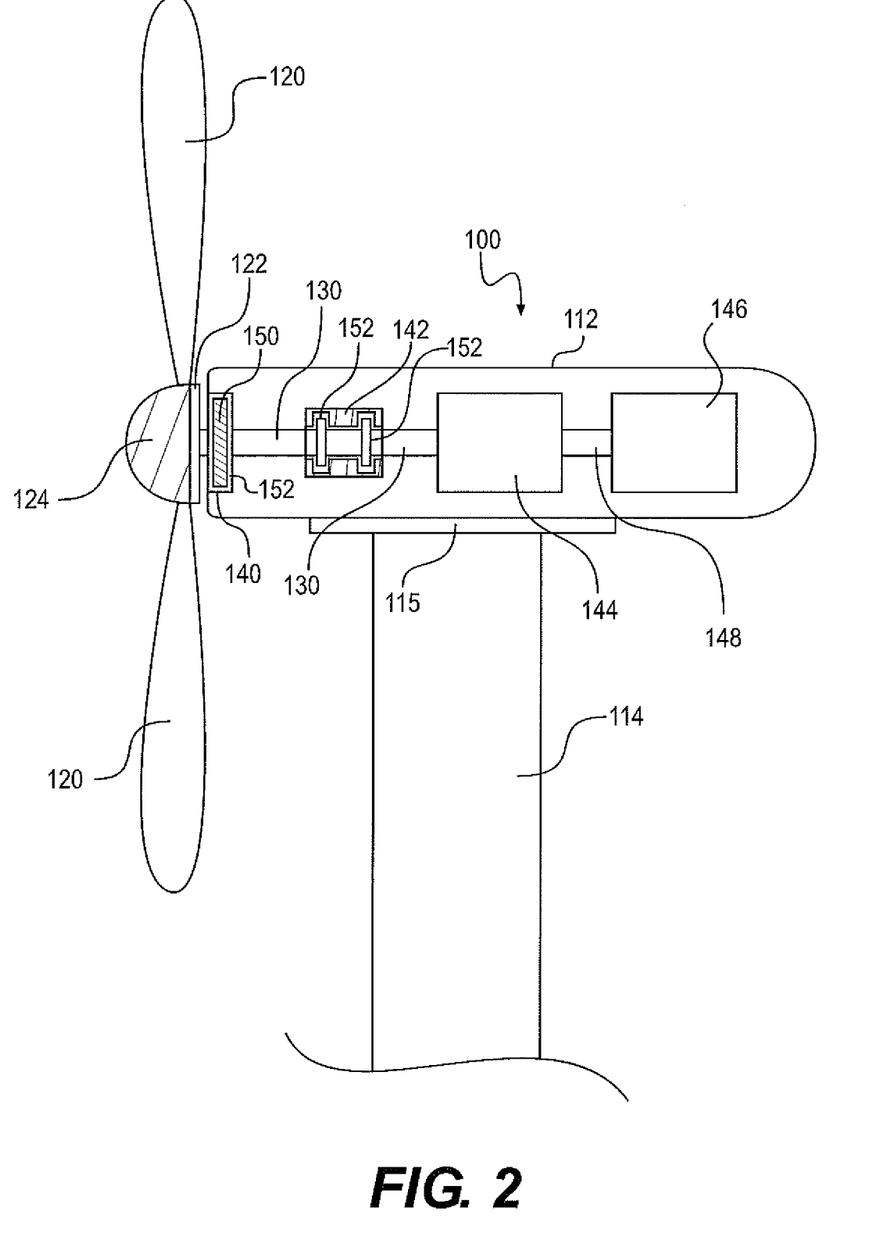
FIG. 2 is a side cross-sectional view of an example of a wind turbine system disclosed herein.

Turning now to FIG. 2, there is shown a new wind turbine system 100 as described herein. The wind turbine system 100 includes a cab 112 mounted onto a turbine tower 114 by way of a rotating table 115. Wind turbine blades 120 are connected to a nose hub 122. An aerodynamic cone 124 is mounted over the nose hub 122. The nose hub 122 is connected to the front of the main turbine shaft 130. The main turbine shaft 130 is supported by a main bearing assembly 140 that includes a main bearing housing 152. A flywheel 150 is mounted around the main turbine shaft 130. The flywheel 150 is contained in and supported by the main bearing assembly 140. The main turbine shaft passes through an intermediate bearing 142. The main turbine shaft 130 includes flanges 152 formed therein or mounted thereon. These flanges 152 are secured in the intermediate bearing 142 to prevent up and down vibration as well as back and forth movement of the main turbine shaft 130. The main turbine shaft then extends into the gear box 144 which translates the rotational speed of the main turbine shaft into a secondary shaft 148 that turns the generator 146.

Figure 3:
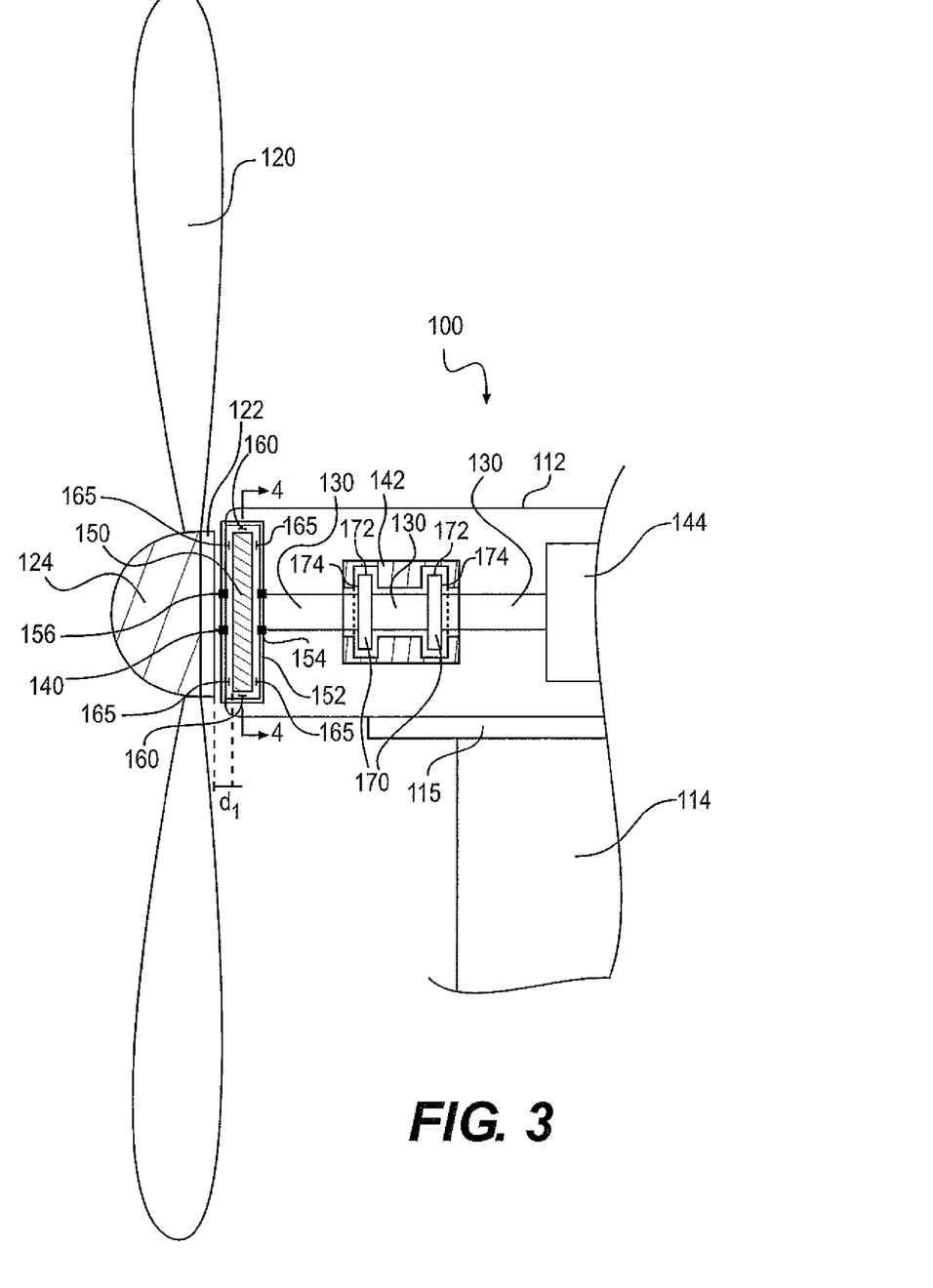
FIG. 3 is an enlarged, partial side cross-sectional view of the front end of a wind turbine system as described herein.

FIG. 3 is a more close up view of the front end of the cab 112 of the wind turbine system 100. There is shown a part of the turbine tower 114 and supporting, rotating table 115. Turbine blades 120 are connected to a nose hub 122. The front of the nose hub 122 is covered by an aerodynamic cone 124. A flywheel 150 is mounted around the main turbine shaft 130 at the front of the cab 112. Importantly, the flywheel 150 is mounted relatively closely to the nose hub 122. As shown, the distance from the front edge of the flywheel 150 to the back edge of the nose hub is a short distance $d_1$. As described earlier, this distance $d_1$ may be approximately 2 to 12 inches, or alternatively about 3 to 6 inches, from the back of the nose hub 122 along the linear length of the main turbine shaft 130 to the near edge of the flywheel 150. Minimizing this distance $d_1$ will minimize the leverage of up and down movement of the main turbine shaft 130 to secure that turbine shaft 130 in the turbine assembly 100.

The main bearing assembly 140 includes a bearing housing 152. As shown, the bearing housing 152 has a rectangular cross-section as shown in FIG. 3, but it would be a round cross-section if shown in FIG. 4 taken along lines 4-4 of FIG. 3. The housing 152 may extend to and adjacent the rotating shaft 130. Obviously, there are apertures in the housing 152 to allow the main turbine shaft 130 to pass through that housing. Front seal 156 and back seal 154 seal lubricant inside the housing 152 and circulating around the flywheel 150. Attached to the main bearing housing 152 are the main bearings 160. These main bearings capture and prevent or minimize the up and down movement of the main turbine shaft 130. Additionally, there are side bearings 165 attached to the bearing housing 152 that act as thrust bearings to prevent the back and forth movement of the main turbine shaft 130.

In the intermediate shaft bearing 142, there are shown the two discs 170. These discs are flanges that may be formed in the rotating shaft 130 or may be separate pieces mounted thereon. These discs are held in the intermediate bearing along disc faces on the top or radial diameter of the bearing 172, and also along the side faces 174 near the outside diameter face 172. This intermediate bearing, in addition to securing the up and down movement of the main turbine shaft 130, also acts as a thrust bearing to prevent the forward and back movement of the main shaft in and out of the cab 120.

Figure 4:
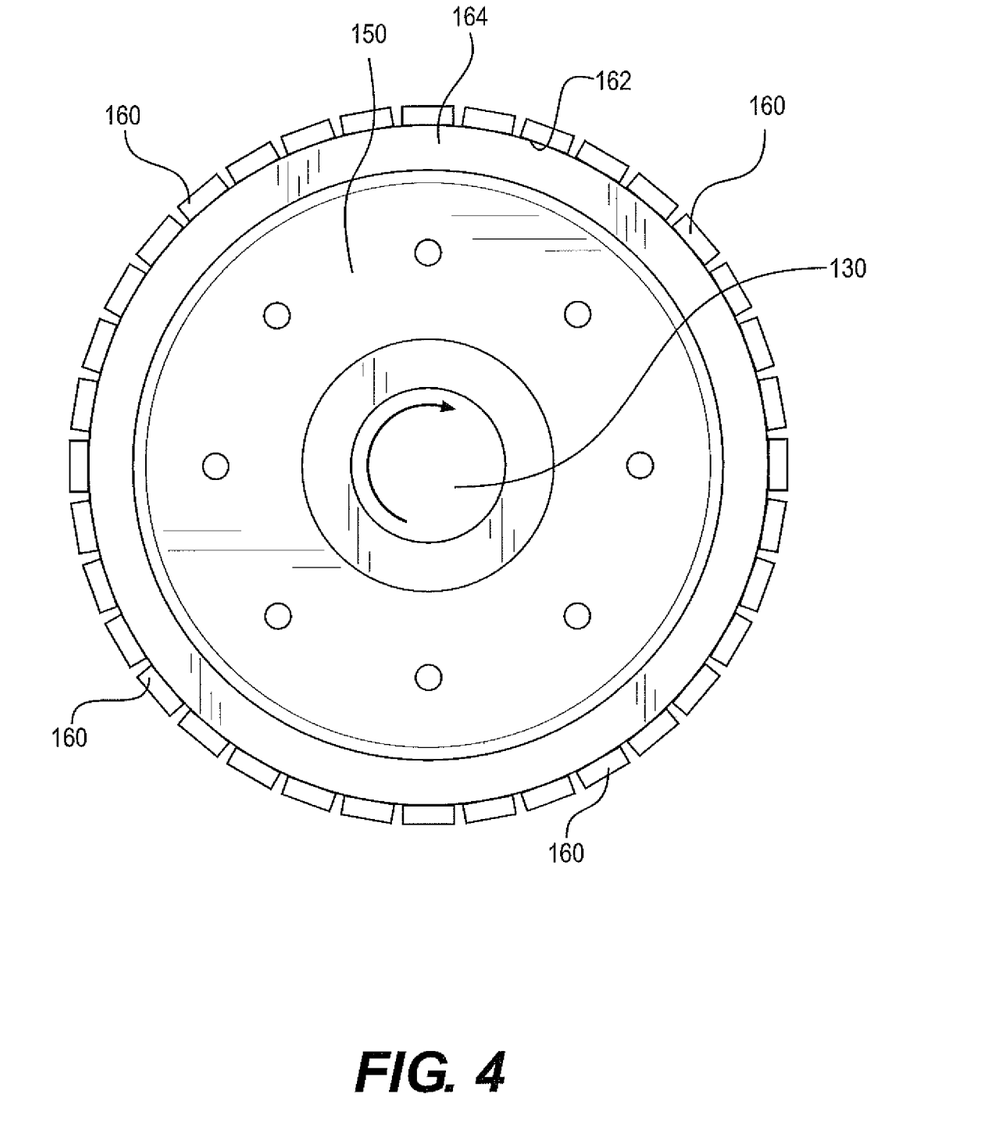
FIG. 4 is a cross-sectional view of a flywheel as described herein.

FIG. 4 is the side, cross-sectional view of the flywheel and main bearing assemblies taken along lines 4-4 in FIG. 3. At the center of the circle is the main turbine shaft 130. The outside diameter 162 of the flywheel 150 is a generally flat surface that is pressed against or within very close tolerance to the multiple main bearing blocks 160 mounted around the outside diameter of that flywheel 150. Please note that, although not shown in FIG. 4, the main bearing blocks 160 would in turn be secured to the main bearing housing that is shown in FIG. 3 and in FIG. 5 but has been left out for purposes of illustration only in FIG. 4. Proximate the outside diameter 162 of the flywheel 150 there are side bearing surfaces 164. This side bearing surface 164 is secured and maintained in place by the side bearing blocks illustrated in FIGS. 3 and 5. The bearing blocks 160 may be more or less numerous than shown in FIG. 4. Similarly, they may be mounted more closely together so that they are closer to each other and, alternatively even in a touching arrangement with respect to the adjacent blocks 160. The number and size of these main bearing blocks 160 will depend on the outside diameter of the particular flywheel 150 that may be deployed.

Figure 5:
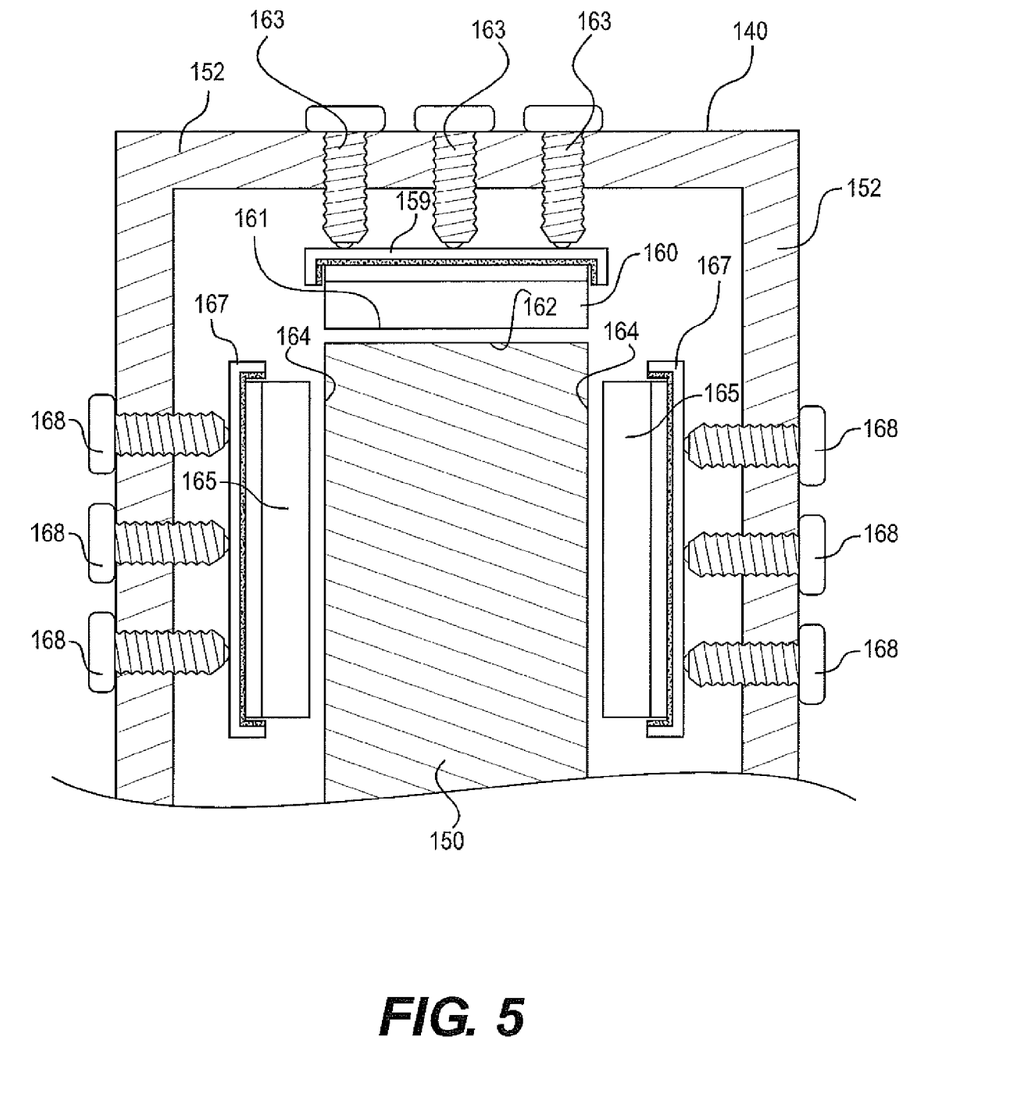
FIG. 5 is side cross-sectional and close up view of a main bearing and sidewall bearings mounted adjacent a flywheel as described herein.

FIG. 5 is a side, partial cross-sectional view of the outside edge of the flywheel 150 inside the main bearing 140. The main bearing assembly 140 includes a rigid housing 152. Attached to the rigid housing 152 is the main bearing block 160 and side bearing blocks 165. The main bearing block 160 is contained within a support tray 159 that is connected by screws 163 to the main bearing housing 152. The screws 163 may be used to move the main bearing block 160 towards the outside surface 162 of the flywheel 150. This tightening adjustment may be necessary during the ordinary wear of the bearing block 160. The bearing surface 161 is the surface that bears against the outside diameter surface 162 of the flywheel 150. Also, three screws 163 are shown as connecting the support tray 159 to the main bearing housing 153. Four or more screws may alternatively be used to secure that support tray 159. Preferably, there are at least three screws used to accomplish this purpose. Although, it is at least hypothetically possible that one or two screws may be used to connect to the support tray 159. The side bearings 165 will bear against the outside surfaces 164 of the flywheel that are proximate the outside diameter 162 of the flywheel. These side wall bearing blocks 165 are fixed in support trays 167 that are in turn connected by screws 168 to the bearing housing 152.

Figure 6:
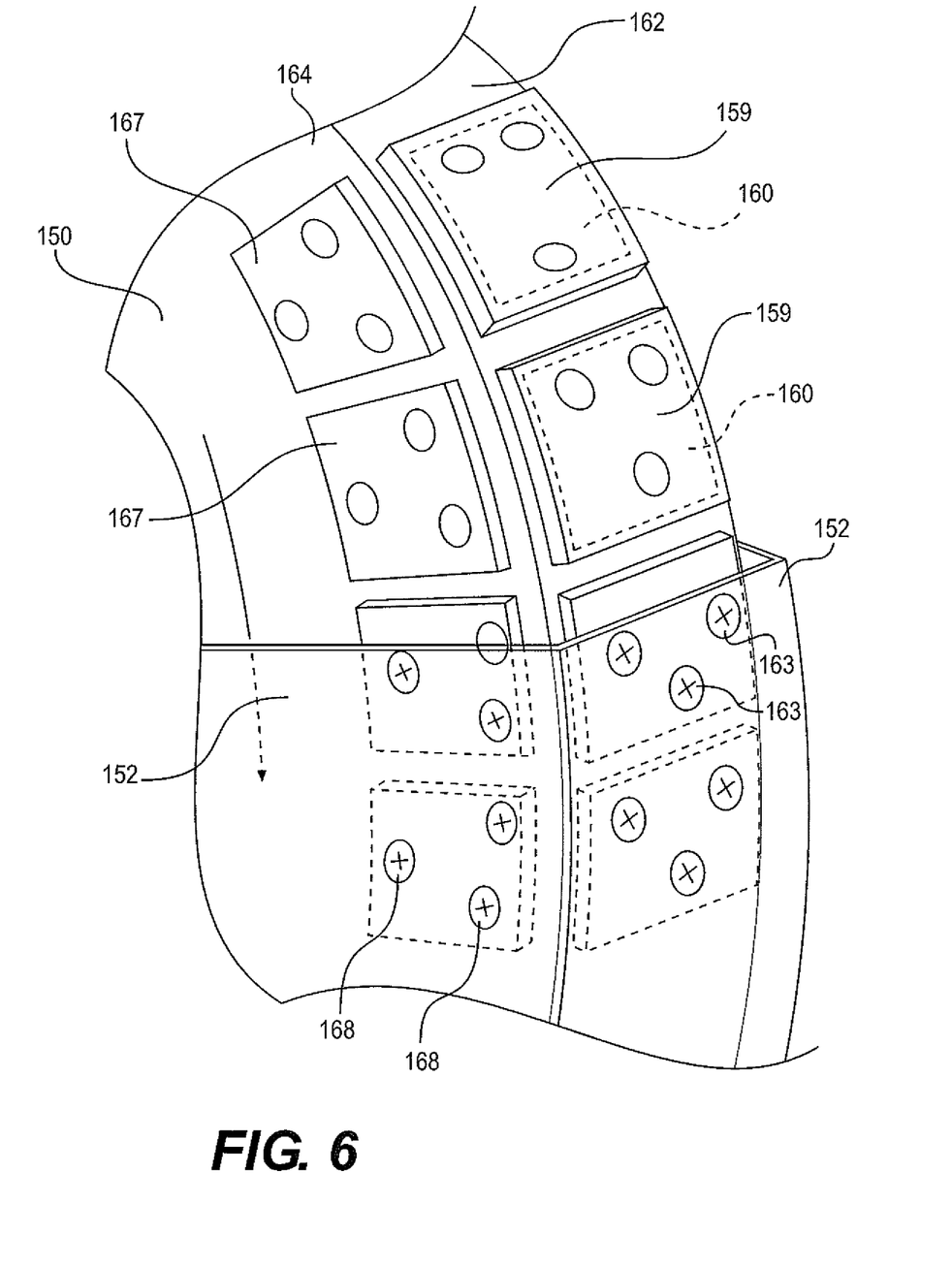
FIG. 6 is a perspective, partial cut-away view of the flywheel having main bearing and sidewall bearing pads mounted around it.
Figure 7:
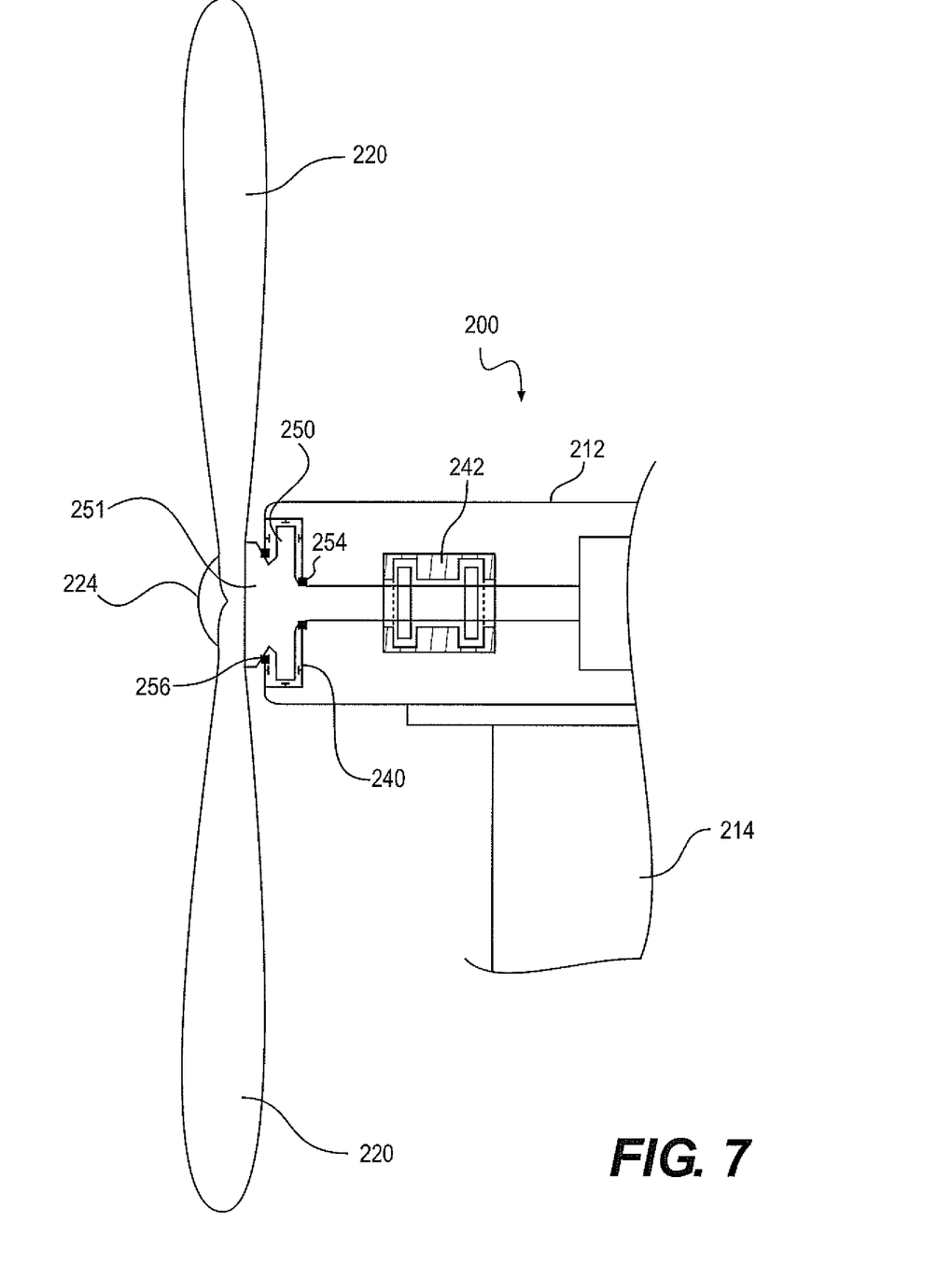
FIG. 7 is a side partial cross-sectional view of another example of a wind turbine system described herein.

FIG. 6 is alternative, perspective view of the rotating flywheel 150 as secured and supported by the main bearing blocks 160 that are carried in their support trays 159. The screws 163 are available on the outside surface of the bearing housing 152 for the purpose of maintenance of the main bearing blocks 160 and making sure that they are tight or within a very tight tolerance of the rotating flywheel 150. Similarly, the side wall support tray 167 is mounted along the side of the bearing housing 152 to secure movement of the rotating flywheel 150.

FIG. 7 illustrates another example of the front end of a bearing assembly 240. The wind turbine assembly 200 includes a cab 212 and support tower 214. Wind turbine blades 220 are connected directly to the front hub-portion 251 of the flywheel 250. An aerodynamic cone 224 is likewise connected directly to the flywheel 250. The main bearing assembly 240 and intermediate bearing assembly 242 are similar in construction and function to that describe in FIGS. 2-6. The main bearing assembly 240 includes front seal 256 and back seal 254 to keep any lubricant sealer in the bearing assembly and circulating around the flywheel 250. The primary difference in FIG. 7 is that the turbine blades 220 are connected directly to the flywheel 250 by way of the hub portion 251. The hub portion 251 of the flywheel 250 may be an integral, unitary component, or alternatively the hub portion and flywheel may be attached directly to each other.

The bearing assemblies 140 and 240 are both necessarily lubricated. The housings are sealed and include seals 154 and 156 (FIG. 3) and 254 and 256 (FIG. 7) to keep the lubricant constantly flowing around the bearing surfaces and flywheel surfaces. As noted earlier, in a lignum vitae bearing system, the lubricant is exclusively, or at least primarily, water which is easily handled and pumped. With other bearing materials, there may be oil-based lubricants or other lubricants that are required to be circulated around and through the bearings and flywheel surfaces. Persons of skill in the art will understand the necessary pumps and nozzles and related hardware to circulate the lubricant around the bearing housing parts and across the flywheel surfaces. For completeness, the intermediate bearings 142 and 242 will likewise require a lubrication system to protect the bearing and rotating shaft/flange components within those bearing assemblies.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A wind turbine system comprising:
a turbine blade connected at a nose hub to a main turbine shaft, wherein the main turbine shaft is operatively connected to a turbine generator, and the turbine blades and main turbine shaft and generator are mounted onto a turbine tower;
a flywheel configured around the main turbine shaft proximate to the nose hub, the flywheel being a disc having a flywheel thickness and defining a circular outside diameter surface;
and a bearing assembly fixed to the turbine tower and around at least a portion of the flywheel including the circular outside diameter of the flywheel;
the bearing assembly further comprising a bearing housing and a main bearing fixed therein having a main bearing face adapted to be in contact with or within a close tolerance to the circular outside diameter surface of the flywheel;
the bearing assembly further comprising sidewall bearings fixed to the bearing housing and having sidewall bearing faces adapted to be in contact with or within a close tolerance to flat sidewall surfaces on opposite sides of the flywheel proximate the outside diameter of the flywheel;
whereby the main turbine shaft is securely maintained and supported so that it rotates without any vibration caused by wind turning the turbine.

2. A wind turbine system as described in claim 1, wherein the main bearing is comprised of lignum vitae wood.

3. A wind turbine system as described in claim 2, wherein the bearing assembly comprises a water lubrication system.

4. A wind turbine system as described in claim 1, wherein the flywheel is mounted around the main turbine shaft and less than twelve inches from the nose hub.

5. A wind turbine system as described in claim 1, wherein the flywheel is mounted around the main turbine shaft less than six inches from the nose hub.

6. A wind turbine system as described in claim 1, wherein the main bearing and sidewall bearings are comprised of lignum vitae wood.

7. A wind turbine system comprising:
a turbine blade connected at a nose hub to a main turbine shaft, wherein the main turbine shaft is operatively connected to a turbine generator, and the turbine blades and main turbine shaft and generator are mounted onto a turbine tower;
a flywheel configured around the main turbine shaft proximate to the nose hub, the flywheel being a disc having a flywheel thickness and defining a circular outside diameter surface;
and a bearing assembly fixed to the turbine tower and around at least a portion of the flywheel including the circular outside diameter of the flywheel;
the bearing assembly further comprising a bearing housing and a main bearing fixed therein having a main bearing face adapted to be in contact with or within a close tolerance to the circular outside diameter surface of the flywheel;
wherein the main bearing comprises a screw that connects the main bearing to the bearing housing, whereby the distance between the main bearing face and the outside diameter surface of the flywheel is adjustable by turning the screw;
whereby the main turbine shaft is securely maintained and supported so that it rotates without any vibration caused by wind turning the turbine.

8. A wind turbine system comprising:
a turbine blade connected at a hub flywheel to a main turbine shaft, wherein the main turbine shaft is operatively connected to a turbine generator, and the turbine blades and main turbine shaft and generator are mounted onto a turbine tower;
the hub flywheel configured around a front end of the main turbine shaft, the hub flywheel being a disc having a flywheel thickness and defining a circular outside diameter surface;
and a bearing assembly fixed to the turbine tower and around at least a portion of the hub flywheel including the circular outside diameter of the hub flywheel;
the bearing assembly further comprising a bearing housing and a main bearing fixed therein having a main bearing face adapted to be in contact with or within a close tolerance to the circular outside diameter surface of the hub flywheel;
whereby the main turbine shaft is securely maintained and supported so that it rotates without any vibration caused by wind turning the turbine.

9. A wind turbine system as described in claim 8, wherein the main bearing is comprised of lignum vitae wood.

10. A wind turbine system as described in claim 9, wherein the bearing assembly comprises a water lubrication system.

11. A wind turbine system as described in claim 8, the bearing assembly further comprising sidewall bearings fixed to the bearing housing and having sidewall bearing faces adapted to be in contact with or within a close tolerance to flat sidewall surfaces on opposite sides of the hub flywheel proximate the outside diameter of the hub flywheel.

12. A wind turbine system as described in claim 11, wherein the main bearing and sidewall bearings are comprised of lignum vitae wood.

13. A wind turbine system as described in claim 8, wherein the main bearing comprises a screw that connects the main bearing to the bearing housing, whereby the distance between the main bearing face and the outside diameter surface of the hub flywheel is adjustable by turning the screw.

* * * * *